(12) United States Patent  (10) Patent No.: US 6,511,266 B1
Groot  (45) Date of Patent: Jan. 28, 2003

(54) WALL FISHING METHOD AND APPARATUS

(76) Inventor: Daniel J. Groot, 1222 S. Dale Mabry #334, Tampa, FL (US) 33629

( * ) Notice: Subject to any disclaimer, the term of this patent is extended or adjusted under 35 U.S.C. 154(b) by 26 days.

(21) Appl. No.: 09/847,687

(22) Filed: May 2, 2001

Related U.S. Application Data

(63) Continuation-in-part of application No. 09/521,350, filed on Mar. 9, 2000, now Pat. No. 6,257,808.
(60) Provisional application No. 60/272,029, filed on Feb. 28, 2001, and provisional application No. 60/237,840, filed on Oct. 3, 2000.

(51) Int. Cl.[7] .......................... B23B 35/00; B23B 49/00
(52) U.S. Cl. .......................... 408/1 R; 408/97; 408/113; 408/115 B; 408/127; 408/200
(58) Field of Search .................. 408/1 R, 72 B, 408/75, 97, 113, 115 B, 241 B, 115 R, 127, 201, 200, 78, 204, 710; 254/134, 3 FT

(56) References Cited

U.S. PATENT DOCUMENTS

| | | | | |
|---|---|---|---|---|
| 1,408,802 A | * | 3/1922 | Crocker et al. ............... 144/92 |
| 2,958,249 A | * | 11/1960 | McNutt ....................... 84/237 |
| 3,006,223 A | * | 10/1961 | Broussard .................... 144/106 |
| 3,016,073 A | * | 1/1962 | Broussard .................... 408/110 |
| 4,605,345 A | * | 8/1986 | Giughese ................. 408/241 B |
| 5,395,188 A | * | 3/1995 | Bailey et al. ................ 408/127 |
| 5,511,915 A | * | 4/1996 | Krahling ................. 408/115 R |
| 5,888,035 A | * | 3/1999 | Cutler ................. 254/134.3 FT |
| 5,947,656 A | * | 9/1999 | Simson et al. ........... 408/115 R |
| 6,257,808 B1 | * | 7/2001 | Groot ................. 254/134.3 FT |

* cited by examiner

Primary Examiner—Daniel W. Howell
(74) Attorney, Agent, or Firm—David Kiewit

(57) ABSTRACT

Holes can be cut squarely through obstructions hidden within a hollow wall by apparatus that may include a flexible guide tube having a work-engaging head at one end; a collared lead screw or other arrangement for bringing the work-engaging head into perpendicular engagement with an obstruction; and a cutting tool for cutting the hole. In a some versions of the invention, two work engaging heads are coaxially attached to the end of the guide tube, inserted into the wall through an access hole, and used to sequentially cut holes through two obstructions. An advantage of this arrangement is that the second, smaller, hole has a large enough diameter to be used for feeding most sorts of flexible lines through the wall. In addition, a panel protecting apparatus is provided so that extensive work can be done within the wall without damaging the margins of the access hole.

21 Claims, 5 Drawing Sheets

WALL FISHING METHOD AND APPARATUS

CROSS REFERENCE TO RELATED APPLICATIONS

This application is a continuation in part of the inventor's allowed U.S. Ser. No. 09/521,350, filed Mar. 9, 2000, now U.S Pat. No. 6,257,808, and claims the priority of U.S. Provisional Applications for Patent No. 60/237,840, filed Oct. 3, 2000, and No. 60/272,029, filed Feb. 28, 2001.

BACKGROUND OF THE INVENTION

1. Field of the Invention

The invention relates to apparatus for and methods of drilling holes through generally inaccessible structural members concealed within hollow walls and for pulling flexible lines through those holes.

2. Background Information

Flexible lines, such as electrical power wires or cables, telephone wires, coaxial video entertainment cables, fiber optic signal transmission lines, water lines (e.g., for a refrigerator's ice maker), etc., can be relatively easily positioned within the walls of a building or above a ceiling of the building if those lines are installed after framing, but before the walls or ceilings are completed. This approach is customary for new construction. Once the structure has been completed, however, adding, replacing, or moving lines within a hollow wall, in a restricted crawl space above a ceiling or beneath a floor, is a much more difficult task.

In many remodeling or "old work" situations in single story residences a new line of some sort or another (e.g., a three conductor non-metallic sheathed electrical power cable) is run through an attic crawl space and down through a hollow wall to a service point (such as a point where an electrical outlet box is to be installed a foot or so above a floor, or a switch box located several feet above the floor). Ideally, to avoid damaging and replacing large portions of the wall surface, a job of this sort requires cutting or drilling a hole through the top plate of the wall, shoving the line through that hole and feeding it to a small access hole cut into the hollow wall. The necessary hole can be drilled from the attic and the line shoved down through the top plate only if there is adequate working clearance - e.g.., if the vertical distance between the top plate and closest roof truss, roofing panel or other obstacle above it is great enough that a workman can put an electric hand drill into position to drill through the top plate. If the service point is located on an exterior wall, this approach commonly fails completely because the vertical free space between the top plate and the lowest overhead roof member is too small. Moreover, even when there is working clearance, there is always a chance for the worker to drill the hole through the top plate between two adjacent wall studs and then find that access hole had been cut between two other walls studs, This commonly requires a second trip into the attic crawl space to drill another hole.

An additional problem arises if a conventional hollow wall contains a horizontal framing member located between the top plate and the sill. In these cases, even if one successfully feeds a line through the top plate of the wall, the presence of the additional framing member blocks the line from being dropped down to an outlet box located near the floor. Prior art practice in such cases generally requires cutting into and removing a portion of the wall in order to gain access to the additional horizontal member. This, of course, requires additional labor in patching the wall and restoring whatever decorative coating was on it before the job was started.

A number of US patents are notable among prior art references in this area, and were described in the parent application hereto. These references include:

U.S. Pat. No. 1,408,802, wherein Crocker et al. teach a flexible drill shaft turning within a flexible coaxial guide tube for use in drilling holes through a plurality of ceiling joists. Crocker et al. provide a collapsible and expandable guide device mounted behind the drill head. Their guide device is adapted to collapse when pushed through a hole in a joist, and to expand under the influence of bias springs when free of the joists. When in its expanded configuration, the guide device acts to space the drill bit away from the upper surface of a ceiling by some preset amount, thus ensuring that each of a plurality of holes is made at the same distance above the ceiling. Crocker et al. do not teach an arrangement for ensuring that the holes drilled by their apparatus are drilled perpendicular to the joists.

U.S. Pat. No. 2,958,349, wherein McNutt teaches the use of a drill bit rotated by a flexible shaft encased in a rigid guide tube. The drill bit is translated toward the work through a bushing affixed adjacent one end of the guide tube.

U.S. Pat. Nos. 3,611,549 and 3,697,188, wherein Pope discloses a flexible-shafted drilling apparatus for forming holes in and installing lines through structural members concealed within hollow walls. Pope teaches the use of a drill bit having a throughhole transverse to the axis. A line or a line leader of some sort can be fed through the throughhole to attach the line to the drill bit, which is then pulled back towards the drill operator by means of the flexible shaft. Pope also teaches the use of a separate tool for guiding his drill bit into cutting contact with the concealed structural member.

U.S. Pat. No. 5,395,188, wherein Bailey et al. teach the use of a curved, rigid guide for positioning a drill bit attached to flexible shaft so as to drill an upwardly angled hole from a starting point near a floor to a finishing point within a hollow wall. Bailey et al. teach the use of their drill guide to drill through the wall and the wall sill or sole plate.

BRIEF SUMMARY OF THE INVENTION

A preferred embodiment of the invention comprises a flexible guide tube having a work-engaging means adjacent a first end of the tube; means for bringing the work-engaging means into perpendicular engagement with an obstruction; and a drill, hole saw, or other cutting tool adapted to be inserted into the second end of the tube and pushed through the tube into cutting engagement with the obstruction. In this embodiment the work-engaging element is adapted to hold the tubular guide in a fixed position against the torsional, or other, forces of a drill or other cutting tool being rotated by means of a flexible shaft disposed within the guide tube so as to cut the throughhole in the obstruction.

Preferred embodiments of the invention use alignment means, such as a collared lead screw arrangement, to draw a cutting head into perpendicular alignment with a working surface. The collared lead screw is fed through a guide tube into operative contact with the working surface and is screwed into the working surface. The collar on the preferred screw is larger in diameter than an axial throughhole formed in a member of the cutting head assembly. In a preferred embodiment, the member having the axial throughhole is prohibited from rotating about the axis of the guide tube.

Another feature of a preferred embodiment of the invention is the combination of a flexible guide tube; a first cutting tool adjacent a first end of the tube and driven by a first flexible shaft to cut a throughhole through a first obstruction disposed within a hollow wall; and a second cutting tool adjacent the first end of the tube and driven by a second flexible shaft to subsequently cut a throughhole through a second obstruction disposed within or at the top or bottom of the hollow wall.

It is an object of a preferred embodiment of the invention to provide for fishing a large diameter flexible line, such as an electrical cable comprising three conductors of #12 AWG diameter, through a guide tube inserted into an access hole cut in a hollow wall and thence through a throughhole in an obstructing structural member. It is also an object of the invention to provide for fishing the large diameter flexible line through a throughhole in an obstructing structural member, into a guide tube aligned with that throughhole and thence to an access hole cut into a hollow wall.

It is a further objective of the invention to provide a method of and apparatus for working through an access hole in a hollow wall to cut a throughhole through an obstruction within the wall without damaging those portions of he wall immediately adjacent the access hole.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

DETAILED DESCRIPTION OF THE INVENTION

Figure 1:
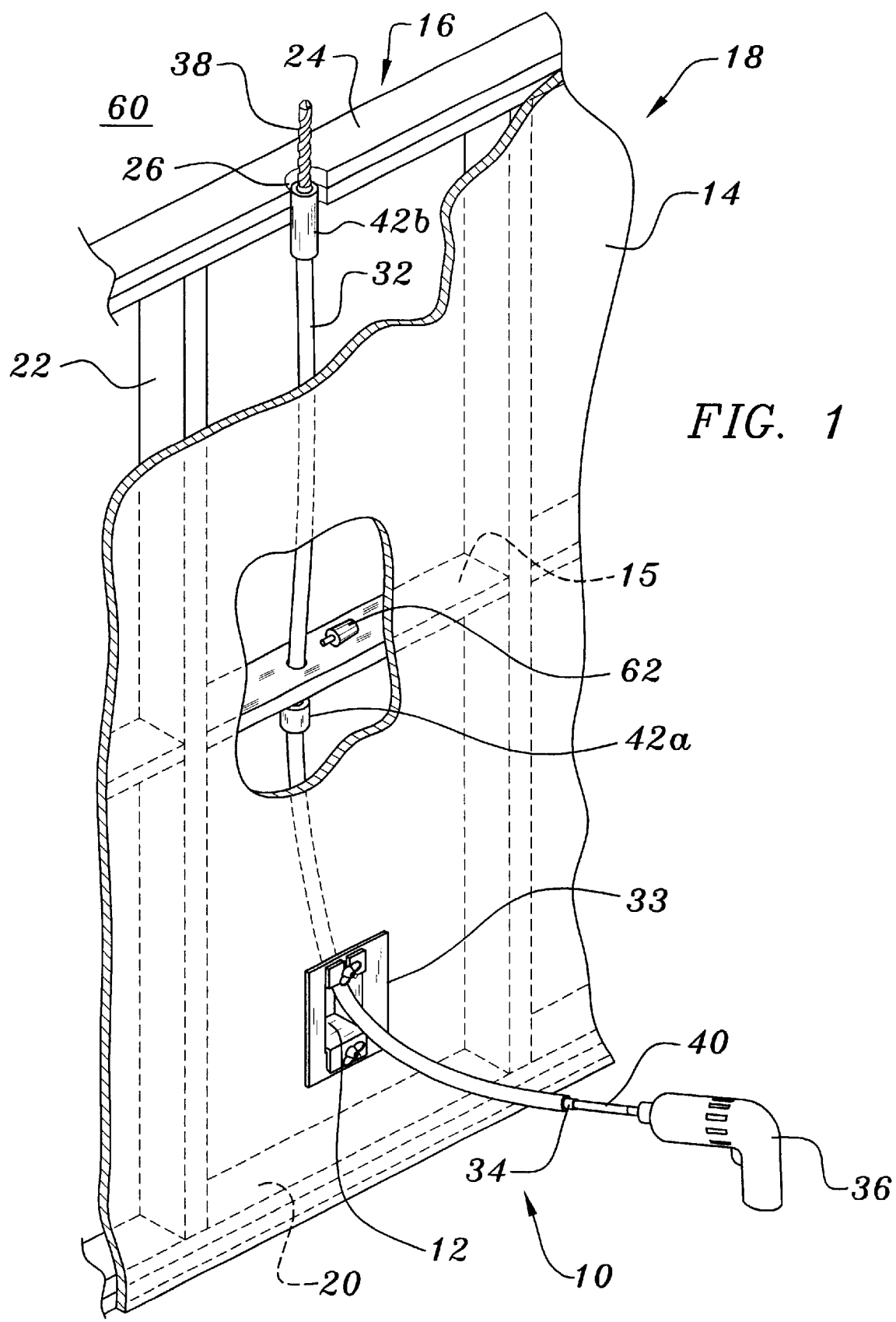
FIG. 1 is a partly cut-away elevational view of an embodiment of the invention being used to drill respective throughholes through both an intermediate obstruction and a top plate of a hollow wall.
Figure 2:
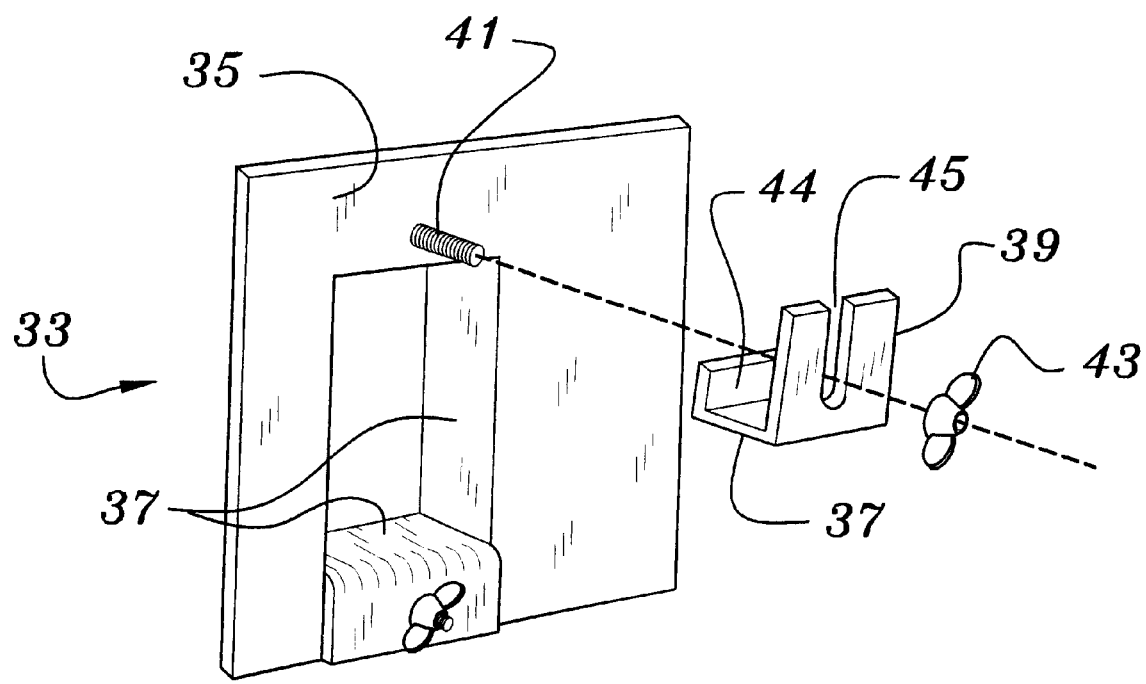
FIG. 2 is an elevational view of a panel-protecting apparatus of the invention.
Figure 6:
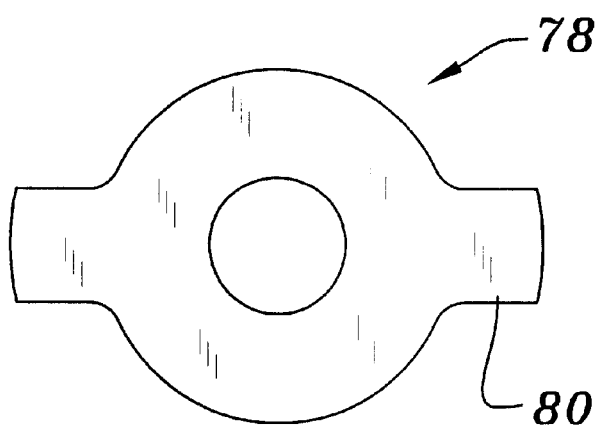
FIG. 6 is an elevational view of a sacrificial guide member.

Turning initially to FIG. 1, one finds a depiction of a preferred embodiment of a flexible shafted shafted hole cutting arrangement 10 of the invention that has been inserted through an access hole 12 in a building panel 14 and that is being used to sequentially cut through two obstructing members 15, 16 inaccessibly located behind the building panel 14. In most cases of interest, the building panel 14 in question is a plasterboard portion of a conventional hollow wall 18 that comprises a sill 20, a plurality of studs 22, an intermediate framing member 15 of the sort required by some local construction codes as a fire-stop, and a top plate 24. In this case the sequential cutting operations involve initially cutting first through the framing member 15 that is intermediate the access hole 12 and the top plate, and then through a final obstruction 16, which may be the top plate 24. All such framing members will be described herein as being within the wall 18, even though all or part of one or more of these members is not covered on two sides by the panel - for example, the top plate of wall will be referred to as being within the wall even though a part of it may extend above an associated wallboard panel. It will be clear to persons skilled in the art, and in particular to those who have read the Crocker reference cited above, that the panel may equally well be a portion of a ceiling (not shown) and the obstructing member 16 may be a joist (not shown) instead of the depicted top plate 24. Moreover, it will also be clear that although the following discussion is presented in terms of drilling respective throughholes 26 through both a fire-stop 15 and a top plate 24 and then fishing a line through those holes, the method and apparatus of the invention are equally applicable to cutting holes in sole plates within hollow walls, or for drilling a hole in a ceiling when a worker wishes to avoid climbing up a ladder in order to directly reach the ceiling.

In the following discussion, the location of various parts of the apparatus and structure are generally described with reference to the position of a worker engaged in cutting the throughhole through which a line is to be fished. Thus, the distal end 30 of a guide tube 32 is that end initially inserted into an access hole 12 adjacent which a drilling operation is conducted. The proximal end of the guide tube 34, on the other hand, commonly protrudes out through the access hole 12 and may be adjacent a drill motor 36 used to drive the cutting tools.

It is known in the art to attach a cutting tool, such as a drill bit 38, to a flexible shaft 40, to insert the cutting tool through an access hole 12 into a hollow wall, to bring it into working engagement with an obstructing member and to then cut a throughhole in that member. One problem common to the use of prior art flexible tools, and to the use of hole cutting apparatus of the invention is that the guide tube 32 can easily be pushed against the wall 18 hard enough to break portions of the wallboard, or other building panel 14 adjacent the access hole 12.

In order to avoid damaging the margins of an access hole, the invention provides a panel protector plate 33 comprising a flat portion 35 extending around the access hole 12 by a hand's breadth or more. In a preferred embodiment, the flat portion 35 extends away from the access hole by about a hand's breadth on one side and by about twice that far on the other three sides of the hole. This allows the wall protector 33 to be used when the access hole is cut near a doorjamb, as is commonly the case when installing a wall switch.

The preferred panel protector 33 additionally comprises inwardly extending portions 37, which may be integrally formed with the flat portion 35, or which may comprise part of a clamping member 39. These inwardly extending portions preferably extend perpendicular to the flat portion 35 of the wall protector 33 by at least a thickness of the building panel 14 with which the protector is being used.

An adjustable clamping arrangement, which preferably comprises a stud 41, a clamping member 39, having a slot formed therein to allow for adjustable attachment, and a wing nut 43 or other threaded fastener, is preferably used at two or more sides of the access hole to hold the protector 33 to the margins of the access hole 33. In a preferred embodiment the clamping member comprises an upturned inward end portion 44 so that whatever line is being pulled through the hole is not abraded or cut on a sharp edge of the clamping member 39.

Workers using prior art flexible-shafted cutting tools for working within a hollow wall have generally found that positioning and guiding the drill bit is very difficult. When a drill bit is pushed lightly against a workpiece and then rotated, the drill commonly "walks" away from the intended location of the hole. The present invention overcomes this problem by incorporating a work engaging head adjacent the distal end of a flexible guide tube 32 that is inserted into an access hole 12. The purpose of the work engaging means is to hold the guide tube 32 in a fixed position while the hole 26 is being drilled and thereby to ensure that the hole is drilled in the desired location. Moreover, preferred embodiments of the invention additionally comprise means for bringing the work engaging head into a perpendicular orientation with respect to a working surface of an obstruction through which a hole is to be drilled.

In the great majority of cases, the obstruction 16 is expected to be a wooden structural member (e.g., a piece of softwood lumber) that can effectively be engaged by a work engaging means comprising an annular or tubular metal member or assembly 44 attached to the distal end of the guide tube 32 and having a common axis with the guide tube 32. This sort of work engaging means may comprise a plurality of sharp prongs, tines, or other sharp upstanding members 46 extending generally parallel to the axis of the guide tube 32. One method of temporarily affixing the tube 32 to a wooden structural member is to vigorously push on the proximal portion of the tube extending through the access hole so as to stab the tines 46 into the wood, and to then drill or cut a hole. A preferred method, however, adds a step of using a threaded tool to draw all the tines 46 evenly into the wood and thereby to align the distal end of the guide tube perpendicular to the working surface of the obstruction into which a hole is to be cut. This minimizes the amount of material that has to be removed to form the hole, and avoids having the line fishing equipment emerge into an obscured space at an unusual and sometimes useless angle.

Once the guide tube 32 has been affixed to the obstructing member 16 by the work engaging head, a drill bit 38, burrin, auger, or other suitable rotary cutting tool attached to the end of a flexible drive shaft 40 that is longer than the guide tube 32 can be brought into operative contact with the obstruction. As is known in the art, such a tool can be conveniently driven by an electric drill motor 36 to cut a throughhole 26 in the obstruction 16, although other tool rotation means, such as a manual brace or a manual egg-beater drill could conceivably be used for this purpose. Regardless of the choice of rotation means, once the throughhole 26 has been formed in the obstructing member 16, the flexible shaft 40 and attached cutting tool 38 are withdrawn from the proximal end 34 of the guide tube 32, leaving the distal end 30 of the guide tube 32 connected to the obstructing member 16 by the work-engaging head.

As discussed above, the guide tube must be somewhat flexible in a direction transverse to its axis, so as to allow it to bend along a fairly gentle radius of curvature when it is being threaded into a hollow wall, as depicted in FIG. 1. On the other hand, the guide tube should also be fairly stiff in a direction along its axis so that a worker can vigorously stab a work-engaging member into a piece of lumber. Although many materials may be considered for this use, a preferred embodiment employs a high density polyethylene tube, of the sort sold for water inlet piping in residential construction. In cases in which a single tube of commercially available piping is used, a preferred outer diameter is about seven eighths of an inch. A tube of this size is strong to withstand vigorous stabs when implanting tines 46 but can also be fairly easily bent to a radius of curvature on the order of one foot, which is generally adequate for working the guide tube into a wall. It is expected that if one were to use tubing having a thinner wall (i.e., where the wall size is not selected to meet plumbing codes that are irrelevant to the present use), a larger diameter could be used to overcome some of the size limitations described hereinafter.

The guide tube 32 may comprise a single tubular piece of material, as depicted, in the drawing, or may comprise several pieces of tubing connected end-to-end when the obstruction is too far from the access hole to be reached with a single section. Preferably, the connectors used to make a long composite tube from several shorter pieces of tubing are configured so as to provide a smooth internal passage and to avoid gaps that might impede passage of a line or fishing member being fed through the composite tube. It will be recognized by those skilled in the art that there are many sorts of tube connectors available, and that connectors of the type generally referred to as "quick connectors" are advantageous in allowing sections of the composite tube to be added or removed quickly and without the use of tools.

Although there are many sorts of line fishing applications, most of the ones of interest involve pulling lines that are on the order of one half inch or less in diameter through a hole cut into an obstruction formed by a piece of nominal two-by-four lumber. A hole formed by a five-eighths inch drill bit, for example has been found to be adequate for pulling insulated power cabling comprising two separately insulated conductors and a ground conductor, where all the conductors are of #12 AWG, through an obstruction. In situations in which two obstructions (e.g., a fire-stop and a top plate) are encountered, one must cut a larger diameter hole through the first obstruction encountered before cutting a hole having at least the minimal acceptable diameter through the second obstruction.

An approach to the problem of cutting through two obstructions was discussed in the inventor's parent application U.S. Ser. No. 09/521,350. This involved cutting a hole through the first obstruction, pulling the cutting tool out of the wall, feeding a second cutting work-engaging head, mounted on a second flexible pipe through the first flexible pipe, and then cutting through the second obstruction.

Figure 3:
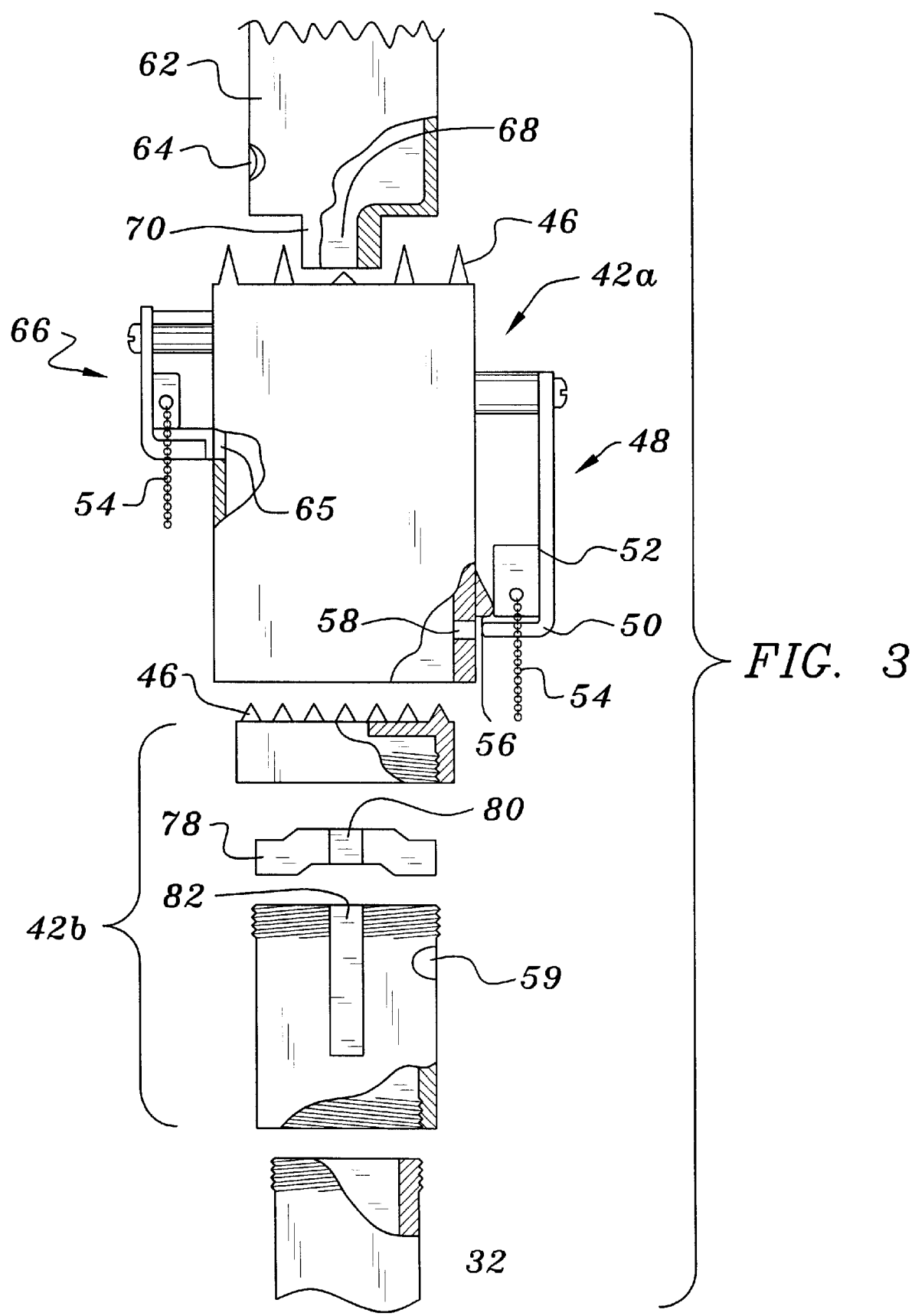
FIG. 3 is an exploded view of dual cutting head apparatus of the invention, which can be used for the hole drilling operations depicted in FIG. 1.

Turning now to FIG. 3, one finds apparatus of the invention comprising both inner 42b and outer 42a work-engaging heads releasably attached to each other in a coaxial configuration. The inner 42b of the two heads is directly attached to a single piece of flexible pipe 32. This apparatus is usable to sequentially cut through two obstructions 15, 16 and to form a throughhole having a diameter of at least five eighths of an inch in the second obstruction penetrated. Although the following discussion is specifically addressed at an arrangement for use in cutting through lumber pieces, it will be understood that the same principles are applicable to other cases, and may involve the use of work-engaging heads comprising permanent magnets when working on a steel-framed structure.

The outer work engaging head 42a is arranged to be detachably connected to the guide tube 32. In a preferred embodiment, the outer work engaging head is attached to the guide tube 32 by a head-retaining latch mechanism 48 comprising a spring-biased pin 50, and a movable member 52 attached to a flexible tension member 54, such as a rope or cable. The latch mechanism 48 has a latched state, in which it acts to prohibit relative motion between the inner 42b and outer 42a heads, and an unlatched state in which it allows the inner head 42b to be axially translated through the outer head 42a. After a hole is cut in the first obstruction, the head-retaining latch can be released by pulling the tension member 54 towards the proximal end 34 of the guide tube. In the depicted embodiment, this causes the movable member to ride over a wedge-like protrusion 56 and force the spring-biased pin out of aligned holes 58, 59 which frees the outer head 42a from the inner head 42b, which is preferably directly threadably connected to the guide tube 32. Those skilled in the art will appreciate that many other sorts of latching mechanisms can be used by an operator adjacent the proximal end of the tool 10 to disconnect an outer head 42 from the guide tube 32 so that the guide tube 32 and inner head 42b can pass through the first obstruction 15.

In a preferred embodiment the throughhole in the first obstruction 15 is cut by means of an expendable hole saw 62 selected to fit within the outer head 42a. The preferred hole saw 62 is made with a locking hole 64 that can be aligned with a corresponding hole 65 in the outer head 42a so that the hole saw 62 can be detachably locked to the head 42a by means of a second latch mechanism 66 that can operate in a manner similar to the first latch mechanism described above. The use of such a latch mechanism allows the hole saw to be held out of contact with the working surface 47 until the head 42a is properly aligned therewith, and to then be released from the head 42a and used to cut a throughhole through the first obstruction.

Figure 4:
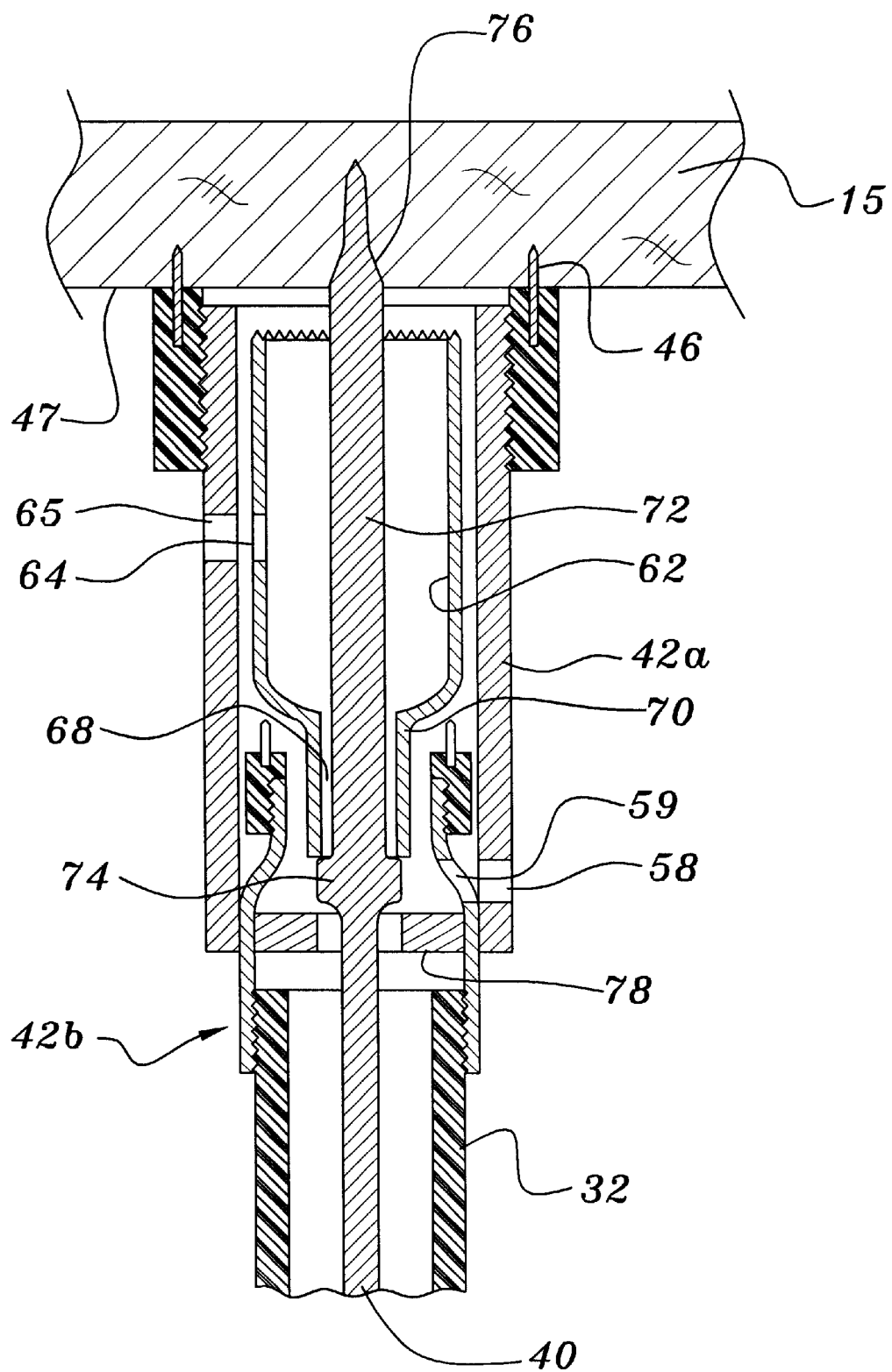
FIG. 4 is an axial cross-sectional view of a dual cutting head apparatus of the invention when it is drawn into perpendicular operative contact with a first obstruction. Latching mechanisms, shown in FIG. 3, have been omitted from this view in the interest of clarity of presentation.
Figure 5:
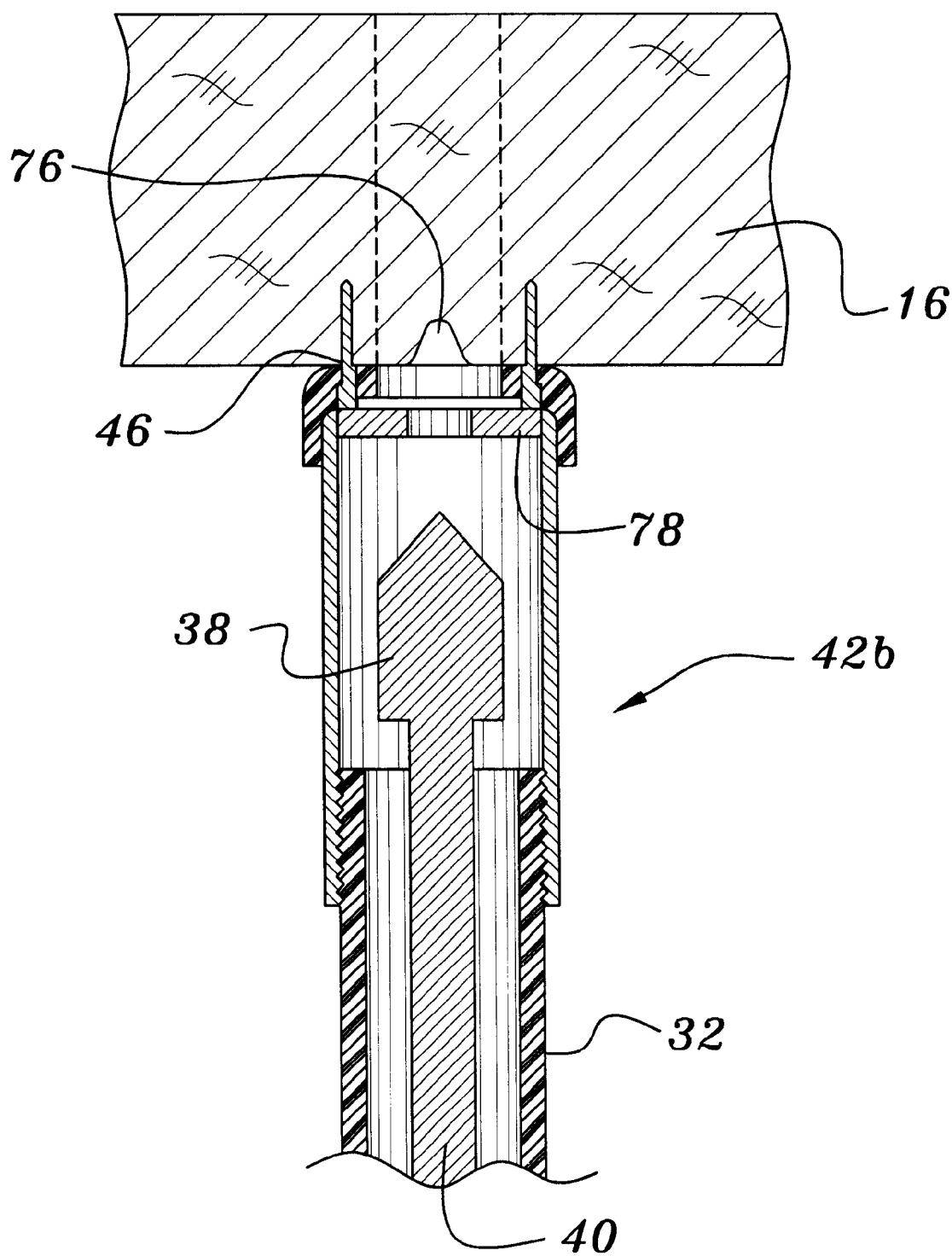
FIG. 5 is an axial cross-sectional view of a cutting head apparatus of the invention when it is drawn into perpendicular operative contact with an obstruction.

A preferred hole saw 62 also comprises an axial throughhole 68 extending through a driving base 70 of the saw 62. As depicted in FIG. 4 a first lead screw 72 having a collar 74 may be inserted through the axial throughhole 68 after the tines 46 of the outer head 42a are stabbed into the first obstruction 15. In a preferred embodiment, the axial hole has a diameter of about five sixteenths of an inch, and the collar 74 has a diameter of about seven sixteenths of an inch so that the lead screw 72 can be feed through the axial hole 68 and rotated by means of a flexible shaft 40 so as to draw the distal end of the outer head 42a into perpendicular contact with the obstruction 15. Once the head 42a has been drawn tightly against the workpiece 15, the lead screw 72 is removed and a saw driving tool (not shown) is fed through the guide tube so as to engage the driving base 70 of the saw 62, the saw 62 is unlatched from outer head 42, pushed into contact with the obstruction 15 and rotated by means of a flexible shaft so as to cut a hole through the first obstruction 15. In a preferred embodiment the driving base 70 has a hexagonal shape and is driven by a driving tool comprising a wrench socket having an axial drill bit extending far enough beyond the socket to engage the pilot hole 76 left by the lead screw 72 used in the alignment operation. This arrangement ensures a well aligned cut. Those skilled in the art will recognize that many other approaches to driving the hole saw, including the use of driving bases having Philips, Allen or Torx-type connectors could equally well be used.

After the hole saw 62 cuts through the initial obstruction 15, the driving tool is used to push it through the hole. When the hole saw disengages from the driving tool, it falls on top of the initial obstruction (e.g., as depicted in FIG. 1) and is abandoned. Other sorts of apparatus could be used to cut a large throughhole in an initial obstruction 15 by using a tool that is subsequently disconnected from the line fishing apparatus 10 because it is too large to be withdrawn through the guide tube 32 when the inner head 42b is in the tube. One could, for example, provide an outer head having an open port on one side. After using a hole saw or large drill bit to cut the throughhole through the initial obstruction 15, that tool could be pulled back into the outer head, disconnected from the driving mechanism, and ejected laterally through the port. In this case the cutting tool would fall downwards from the initial obstruction (e.g., to a sill plate) into a position from which it could possibly be retrieved after the other cutting and line pulling operations were completed.

At this point in the process the inner head 42b is unlatched from the outer head 42a, is pushed through the first obstruction and brought into contact with the second, final obstruction 16. In a preferred embodiment, the tines 46 of the inner head 42b are initially retained within the head and have lower ends that rest on a sacrificial washer 78, which in a preferred embodiment has an axial throughhole of about one half inch diameter. Rather than stabbing the tines 46 into the final obstruction 16, a second lead screw having a larger collar than was used with the first lead screw is fed through the guide tube 32. The collar, which in a preferred embodiment has a diameter of about nine sixteenths of an inch, can not pass through the hole in the sacrificial washer 78. Thus, in a manner analogous to that depicted in FIG. 4, the second lead screw bears against the sacrificial washer, pushes the tines 46 into the obstruction, and thereby draws the inner head 42b into perpendicular contact with the final obstruction 16. After the second lead screw is withdrawn from the guide tube 32 a drill bit 38, which preferably has a diameter of five eighths of an inch, is fed through the guide tube 32. The drill bit 38 is rotated by means of a flexible shaft to cut first through the sacrificial washer and then through the obstruction 16. To make this process work better and to avoid possibly bending the tines while driving them into the obstacle, the sacrificial washer 78 is constrained to be unable to rotate about the axis of the guide tube. This may be arranged, for example, by providing the sacrificial washer with ears 80 that cooperate with a slot or slots 82 in the inner head 42b; by having a plurality of throughholes in the washer that cooperate with guide pins (not shown) fixed within the second head 42b; by inserting a non-circular washer into a mating non-circular retainer portion of the head 42b; or by other means known in the mechanical arts. Moreover, the drill bit 38 is selected to be short enough to conveniently be fed through the guide tube 32 without binding or hanging up. In a preferred embodiment, the drill bit 38 is about one inch in length.

In the foregoing discussion, the use of axially movable tines 46 in the inner head 42b is preferred partly to reduce the overall length of the assembly when the two heads 42a, 42b are connected and partly to allow for the use of fewer tines 46, as is dictated by the relatively small size of the inner head 42b.

After the second barrier is penetrated, the drill bit 38 is pulled out of the proximal end of the guide tube 32, which is then available for use in pulling a line, as described in detail in the parent case of this application. After the line has been pulled, the guide tube 32, with the inner head 42b attached to its distal end, is pulled downward to pull the tines 46 out of the final obstruction 16. When the inner head 42b is pulled through the hole in the intermediate obstruction 15, and into the outer head 42a, the latches 48, 66 engage the proximal end of the inner head 42b, thus allowing the tines of the inner head 42a to be pulled out of the intermediate obstruction 15 so that both heads 42a, 42b can be withdrawn from the wall 18.

In the majority of wall fishing applications there is only one obstruction to contend with and no intermediate or fire-stop obstruction is encountered. In these cases one can dispense with the outer head 42a and sacrificial hole saw 62, and cut a hole in the single obstruction by using only the inner head 42b and drill 38, as described above.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. Apparatus for cutting a hole through an obstruction disposed within a hollow wall, the apparatus comprising:
    a guide tube having two ends, the guide tube adapted to flex in a direction transverse to an axis thereof;
    a work engaging head attached to the guide tube adjacent a first of the two ends, the work engaging head adapted to engage the obstruction, the work engaging head comprising a member having an axial throughhole therethrough;
    a lead screw having a collar operatively associated therewith, the collar having a diameter greater than a diameter of the axial throughhole, the lead screw adapted to be inserted through the throughhole and turned into the obstruction by a flexible shaft so as to draw the work engaging head into perpendicular contact with the obstruction; and
    a cutting tool adapted to cut the hole when the work engaging head is in perpendicular contact with the obstruction.

2. The apparatus of claim 1 wherein the work engaging head is adapted to retain a hole saw, the hole saw comprising a driving base having the axial hole extending therethrough.

3. The apparatus of claim 1 wherein the work engaging head is adapted to retain a sacrificial washer so that the sacrificial washer is prohibited from turning about the axis, the sacrificial washer having the axial hole extending therethrough.

4. Apparatus for cutting respective throughholes through an intermediate and a final obstruction disposed within a hollow wall, the apparatus comprising:
    a guide tube having two ends, a distal end of the guide tube adapted to be inserted into the wall to engage the obstructions, the guide tube adapted to flex in a direction transverse to an axis thereof;
    an inner work engaging head directly attached to the distal end of the guide tube, the inner work engaging head adapted to engage the final obstruction;
    an outer work engaging head adapted to engage the intermediate obstruction; and
    a latching device having a latched state in which the inner work engaging head is attached to the outer work engaging head so as to prohibit relative motion therebetween and an unlatched state in which the inner work engaging head can pass through the outer work engaging head.

5. The apparatus of claim 4 further comprising alignment means for drawing the inner work engaging head into a perpendicular alignment with a surface of the final obstruction.

6. The apparatus of claim 4 further comprising alignment means for drawing the outer work engaging head into a perpendicular alignment with a surface of the intermediate obstruction.

7. The apparatus of claim 4 wherein the outer work engaging is adapted to retain a hole saw.

8. The apparatus of claim 4 wherein the outer work-engaging head is adapted to engage the intermediate obstruction by means of a plurality of tines at a distal end thereof.

9. The apparatus of claim 4 wherein the inner work-engaging head is adapted to engage the final obstruction by means of a plurality of tines adjacent a distal end thereof.

10. Apparatus for cutting a hole through an obstruction disposed within a hollow wall, the apparatus comprising:
    a guide tube having two ends, the guide tube adapted to flex in a direction transverse to an axis thereof, the guide tube adapted to be inserted into the hollow wall through an access hole formed in a panel portion of the wall;
    a work engaging head attached to the guide tube adjacent a first of the two ends thereof, the work engaging head adapted to engage the obstruction;
    a cutting tool driven by a flexible shaft attached to a tool rotating means adjacent the second end of the guide tube; and
    a panel protector comprising a plate extending around the access hole, the panel protector further comprising an second portion extending perpendicular to the plate by an extent greater than a thickness of the panel.

11. The apparatus of claim 10 wherein the work engaging bead is adapted to engage the obstruction by means of a plurality of tines adjacent a distal end thereof.

12. The apparatus of claim 10 wherein the panel protector further comprises a clamping member having an inwardly extending portion having an upward turned end.

13. A method of cutting a hole through an obstruction disposed within a hollow wall, the method comprising the steps of:
    inserting a flexible guide tube having a work engaging head on a distal end thereof through an access hole into the wall so as to bring the work engaging head into contact with the obstruction;
    feeding a lead screw through the guide tube from the proximal end thereof to the obstruction and turning the lead screw so as to draw the work engaging head into perpendicular abutting contact with a working surface of the obstruction; and
    turning a cutting tool to cut the hole through the obstruction.

14. The method of claim 13 further comprising an additional step carried out after bring the work engaging head into contact with the obstruction, the additional step comprising stabbing at least one of a plurality of tines attached to the work engaging head into the obstruction.

15. The method of claim 13 wherein the cutting tool comprises a hole saw.

16. The method of claim 13 wherein the cutting tool comprises a drill bit.

17. The method of claim 13 wherein the work engaging head comprises an axial throughhole having a selected diameter and wherein the lead screw has a collar operatively associated therewith, the collar having a diameter greater than the selected diameter.

18. A method of cutting respective holes through both an intermediate and a final obstruction, wherein both the intermediate and the final obstruction are disposed within a hollow wall, the method comprising the steps of:
    engaging the intermediate obstruction with a first work engaging head attached to a distal end of a flexible guide tube;

cutting a hole through the intermediate obstruction by using a first hole cutting tool initially retained within the first work engaging head;

feeding a second work engaging head through the hole in the intermediate obstruction;

engaging the final obstruction with the second work engaging head;

passing a second hole cutting tool through the guide tube from a proximal end thereof; and cutting a hole through the final obstruction by using the second bole cutting tool.

19. The method of claim 18 comprising an additional step of drawing the first work engaging head into perpendicular contact with the intermediate obstruction, the additional step taken after engaging the intermediate obstruction but before cutting the hole therethrough.

20. The method of claim 18 comprising an additional step of drawing the second work engaging head into perpendicular contact with the final obstruction, the additional step taken after engaging the final obstruction but before cutting the hole therethrough.

21. The method of claim 18 wherein the hole cutting tool initially retained in the first head comprises a hole saw, the method comprising an additional step carried out after the hole is cut by means of the hole saw, the additional step comprising disconnecting the hole saw from the guide tube.

* * * * *